(No Model.)

H. NOELTE.
CARRIAGE WHEEL BOX.

No. 565,630. Patented Aug. 11, 1896.

Witnesses
H. van Oldenneel
E. A. Scott

Inventor
Hermann Noelte
by
Attorneys

UNITED STATES PATENT OFFICE.

HERMANN NOELTE, OF BERLIN, GERMANY.

CARRIAGE-WHEEL BOX.

SPECIFICATION forming part of Letters Patent No. 565,630, dated August 11, 1896.

Application filed November 26, 1895. Serial No. 570,247. (No model.)

*To all whom it may concern:*

Be it known that I, HERMANN NOELTE, a citizen of Prussia, residing at Hallesches Ufer 21, Berlin, S. W., Germany, have invented certain new and useful Improvements in Carriage-Wheel Boxes; and I do hereby declare the following to be a full, clear, and exact description of the invention, such as will enable others skilled in the art to which it appertains to make and use the same.

The object of this invention is to facilitate the removal of the wheel from its axle without the hub coming in contact with the axle-grease. This, for instance, is necessary for folding baby-carriages where the cushions and other parts are placed in the folded carriage when it is desired to forward the same by rail or the like.

Figure 1:
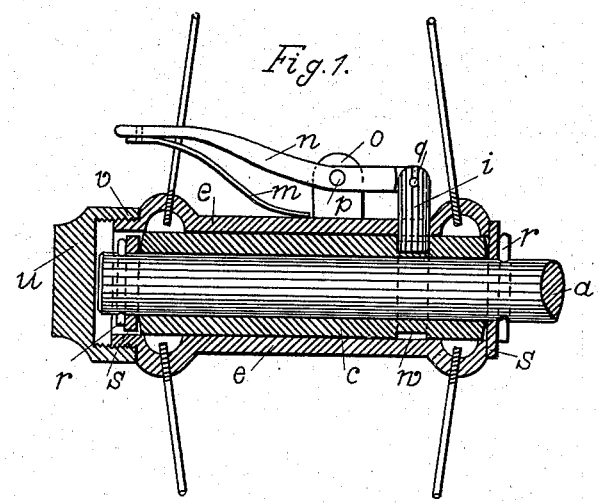
Figure 2:
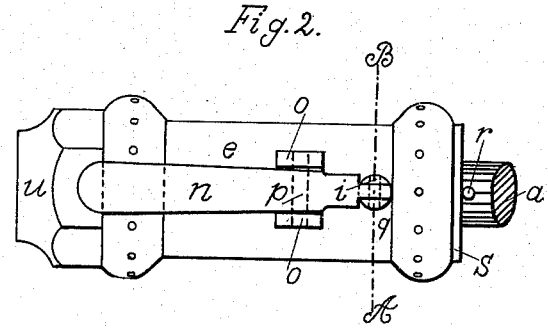
Figure 3:
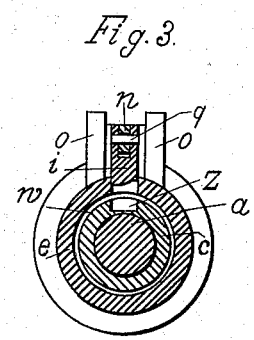

In the drawings, Figure 1 is a longitudinal section of the axle and the hub; Fig. 2, a top view of the hub; Fig. 3, a cross-section on the line A B of Fig. 2.

The grease-box $c$ is pivotally arranged upon the axle $a$ between the two disks S S, which are fixed by means of the pins $r$ $r$. The hub $e$ is pushed over the grease-box $c$ from the front of the axle. The lever $n$, pivotal around $p$, is placed upon the hub between the two uprights $o$ $o$. At the end of this lever a bolt $i$ is linked to the pin $q$, which penetrates into a notch Z, Fig. 3, of the grease-box $c$ through an opening in the hub $e$. At the other end of said lever a spring $m$ is fixed, which has the tendency to press the bolt $i$ in the notch Z. As soon as the bolt $i$ has penetrated the notch Z the grease-box $c$ will rotate around the axle $a$ with the hub $e$. In order that the bolt $i$ will snap more easily in the notch Z, a circular groove $w$ is made in the box $c$, Figs. 1 and 3. A light pressure upon the free extremity of the lever $n$ will remove the bolt $i$ from the notch Z and the wheel can be removed over the head of the axle.

In order to prevent the front disk S with the pin $r$ from being lost and to protect at the same time the grease-box against dust or dirt, a cap $u$ is screwed upon a projection of the hub $e$ by means of the thread $v$, so that a solid closure is effected.

I claim—

A removable hub comprising the grease-box, the hub fitting over the same, the lever $n$ and the link-bolt $i$ connected therewith, to be operated thereby, said bolt passing through an opening in the hub and into a notch in the grease-box, substantially as described.

In testimony whereof I affix my signature in presence of two witnesses.

HERMANN NOELTE.

Witnesses:
   W. BESCHETZNICK,
   ERNST WULFF.